(12) United States Patent
Bae

(10) Patent No.: US 8,795,874 B2
(45) Date of Patent: Aug. 5, 2014

(54) BATTERY PACK

(75) Inventor: Kwangsoo Bae, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 155 days.

(21) Appl. No.: 12/929,995

(22) Filed: Mar. 1, 2011

(65) Prior Publication Data

US 2011/0274963 A1     Nov. 10, 2011

(30) Foreign Application Priority Data

May 7, 2010   (KR) .................. 10-2010-0042995

(51) Int. Cl.
*H01M 2/24*    (2006.01)

(52) U.S. Cl.
USPC ........................................ 429/158; 429/160

(58) Field of Classification Search
None
See application file for complete search history.

(56) References Cited

U.S. PATENT DOCUMENTS

| | | | |
|---|---|---|---|
| 7,300,305 B2 * | 11/2007 | Scotton et al. | 439/500 |
| 7,775,810 B2 * | 8/2010 | Lawrence et al. | 439/121 |
| 2005/0287427 A1 | 12/2005 | Kim et al. | |
| 2008/0063932 A1 | 3/2008 | Ishizu et al. | |

FOREIGN PATENT DOCUMENTS

| | | |
|---|---|---|
| JP | 10-308205 A | 11/1998 |
| KR | 10 2005-0121909 A | 12/2005 |
| KR | 10 2007-0081533 A | 8/2007 |
| KR | 10 2008-0023092 A | 3/2008 |

* cited by examiner

*Primary Examiner* — Milton I Cano
*Assistant Examiner* — Carmen Lyles-Irving
(74) *Attorney, Agent, or Firm* — Lee & Morse, P.C.

(57) ABSTRACT

A battery pack including a stack, the stack including a plurality of cells having different polarities at top and bottom surfaces thereof, the plurality of cells being arranged such that at least two cells are arranged along a short axis of the stack when viewed from top or bottom surfaces of the cells, and center connecting lines of adjacent cells along a long axis of the stack are other than perpendicular to the short axis; and conductive plates electrically connecting the plurality of cells to each other, each of the conductive plates including connection parts electrically connected to the cells and a linking part between the connection parts, wherein each of the connection parts includes at least two welding points and a line connecting the welding points, the line being parallel with the short axis of the stack.

9 Claims, 5 Drawing Sheets

BATTERY PACK

Priority is claimed to Korean Patent Application No. 10-2010-0042995, filed on May 7, 2010 in the Korean Intellectual Property Office, and entitled: "Battery Pack," the content of which is incorporated by reference herein in its entirety.

BACKGROUND

1. Field

Embodiments relate to a battery pack.

2. Description of the Related Art

Generally, in industrial devices requiring a large power capacity, e.g., notebook computers, or electronic devices, a single battery cell may not be enough to be a power source. Accordingly, in order to attain desired voltage and capacity, the power source adapted to a notebook computer or the like may be a battery pack having a plurality of battery cells arranged in, e.g., a series connection, a parallel connection, or a combination of series and parallel connections. A conductive nickel plate may generally be used as a connecting member for connecting the plurality of secondary battery cells in series or parallel. The conductive nickel plate may have a connection part connected to the plurality of secondary battery cells and commonly welded to positive or negative electrodes of the plurality of secondary battery cells. In such a manner, a plurality of secondary battery cells may be connected in series to each other.

Welding may be performed using an automatic welding device. A plurality of battery cells may be aligned and the conductive nickel plates may then be, e.g., electrically mechanically welded to the respective battery cells by moving the automatic welding device in a predetermined direction.

SUMMARY

Embodiments are directed to a battery pack which represents advances over the related art.

It is a feature of an embodiment to provide a battery pack configured to improve operation efficiency by optimizing movement flow of an automatic welding device performing a welding operation using conductive plates in a state in which a plurality of secondary battery cells are connected in parallel or series so as to have optimal spatial arrangements.

At least one of the above and other features and advantages may be realized by providing a battery pack including a stack, the stack including a plurality of cells having different polarities at top and bottom surfaces thereof, the plurality of cells being arranged such that at least two cells are arranged along a short axis of the stack when viewed from top or bottom surfaces of the cells, and center connecting lines of adjacent cells along a long axis of the stack are other than perpendicular to the short axis; and conductive plates electrically connecting the plurality of cells to each other, each of the conductive plates including connection parts electrically connected to the cells and a linking part between the connection parts, wherein each of the connection parts includes at least two welding points and a line connecting the welding points, the line being parallel with the short axis of the stack.

The cells may be connected with a series connection, a parallel connection, or a combination of series and parallel connections.

The conductive plates may be welded to top and bottom surfaces of the cells, respectively, according to a connection method of the cells.

Each of the connection parts may include a current fence separating the at least two welding points from each other by a predetermined distance.

The at least two welding points may include a first welding point and a second welding point and wherein each of the connection parts includes a first welded part that in turn includes the first welding point, a second welded part that in turn includes the second welding point, and a current fence separating the first welded part and the second welded part from each other by a predetermined distance.

The stack may include two cells arranged along the short axis thereof, and the battery pack may include two or more layered stacks.

The conductive plates may include a 2N type conductive plate, the 2N type conductive plate including connection parts at opposite ends of the linking part, respectively, and electrically connecting two cells.

The conductive plates may include a 4N type conductive plate, the 4N type conductive plate including second linking parts at opposite ends of the linking part and a connection part at opposite ends of the respective second linking parts, and electrically connecting four cells.

The conductive plates may include a first conductive plate of a 4N type configuration, the 4N type configuration conductive plate including second linking parts at opposite ends of the linking part, and connection parts at opposite ends of each of the second linking parts, and electrically connecting four cells; and a second conductive plate of a 2N type configuration, the 2N type configuration conductive plate including a connection part at opposite ends of the linking part, and electrically connecting two cells.

BRIEF DESCRIPTION OF THE DRAWINGS

The above and other features and advantages will become more apparent to those of ordinary skill in the art by describing in detail exemplary embodiments with reference to the attached drawings, in which:

FIG. 6b illustrates a back side of the battery pack of FIG. 6a; and

FIG. 7 illustrates a perspective view of the battery pack of FIG. 6a.

DETAILED DESCRIPTION

Figure 1:
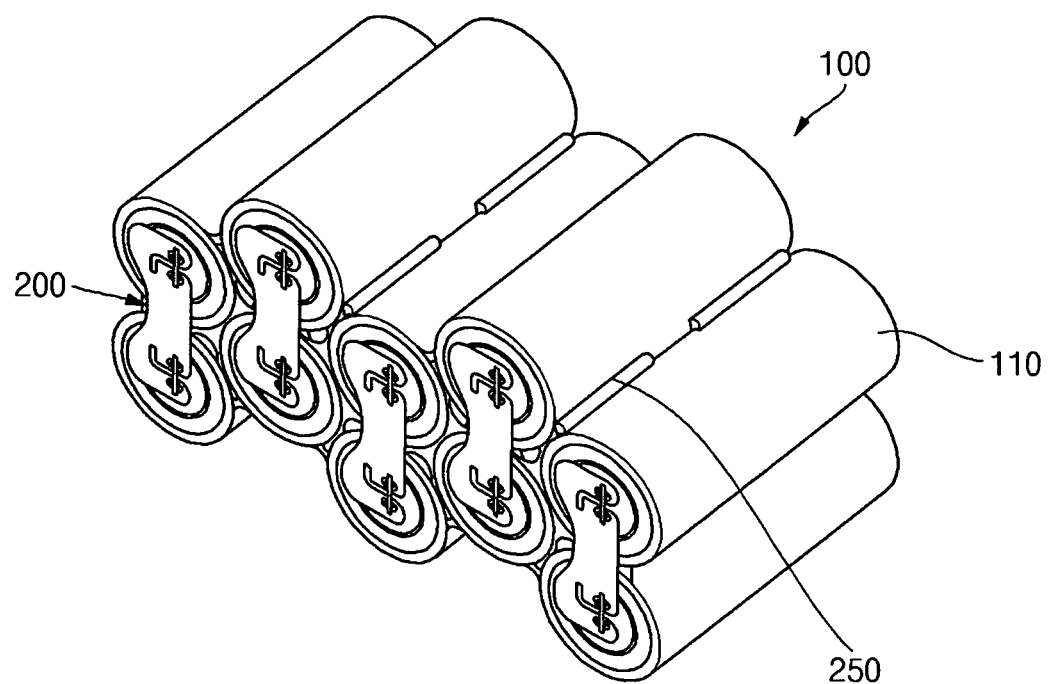
FIG. 1 illustrates a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
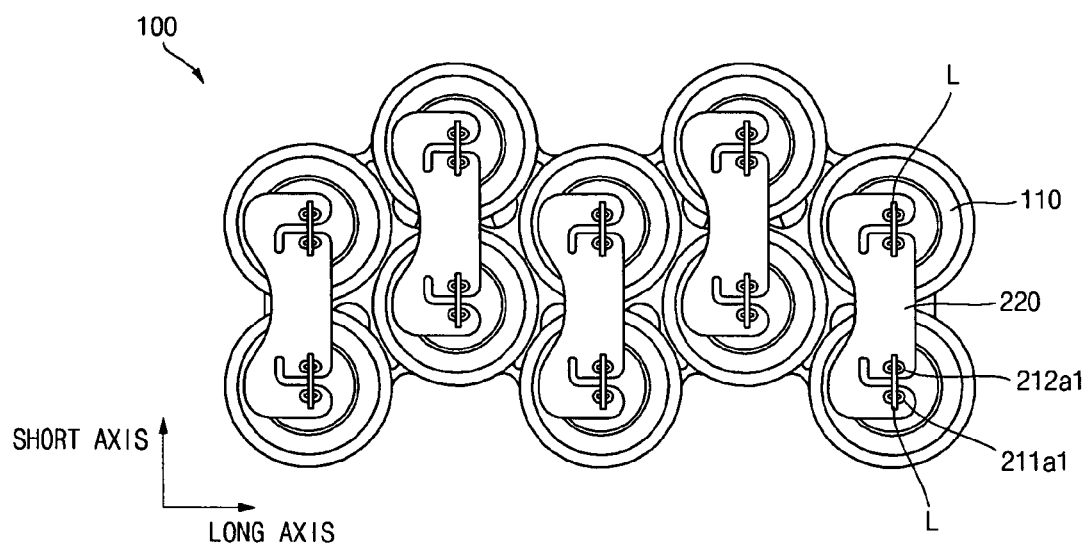
FIG. 2 illustrates a front view of the battery pack of FIG. 1.
Figure 3:
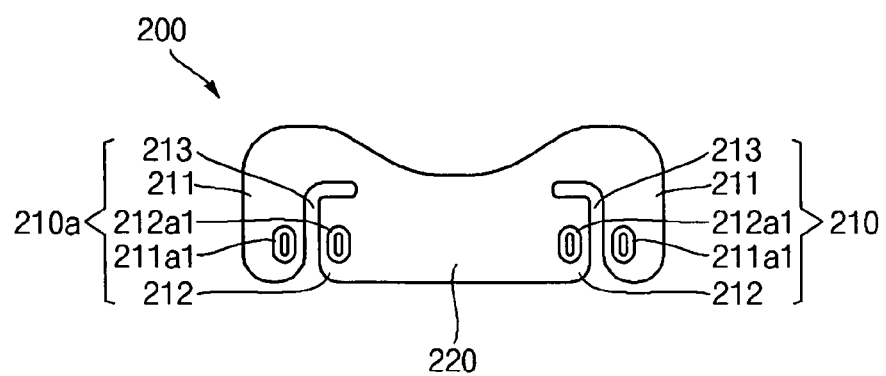
FIG. 3 illustrates a conductive plate of FIG. 1.

FIG. 1 illustrates a battery pack according to an embodiment. FIG. 2 illustrates a front view of the battery pack of FIG. 1. FIG. 3 illustrates a conductive plate of FIG. 1.

As illustrated in FIGS. 1 through 3, the battery pack according to an embodiment may include a stack 100 including a plurality of cells 110 having different polarities at top and bottom surfaces thereof and conductive plates 200 electrically connecting the plurality of cells 110.

The stack 100 may include a plurality of cells 110 arranged such that at least two cells 110 are arranged along a short axis of the stack 100 when viewed from top or bottom surfaces of the cells 110. In addition, center connecting lines of cells 110 adjacent along a long axis of the stack 100 may not be perpendicular to the short axis. That is to say, the plurality of cells 110 may be arranged such that an angle θ between the short axis and each of the center connecting lines of the cells 110 adjacent along the long axis is not 90 degrees. In other words, the cells 110 may be arranged in an offset configuration. Hereinafter, the terms "long axis" and "short axis" refer to the long axis of the stack 100 and the short axis of the stack 100, respectively.

As illustrated in FIGS. 1 and 2, the plurality of cells 110 may include two cells 110 arranged along the short axis. In addition, the cells 110 arranged along the long axis may be in a zigzag configuration between the cells 110 arranged along the short axis. With this configuration, space utilization efficiency may be maximized.

The cells 110 may include, e.g., nickel-cadmium (Ni—Cd) batteries, nickel-hydrogen (NiMH) batteries, lithium (Li) batteries, lithium ion (Li-ion) batteries, lithium polymer batteries, or equivalents thereof, but are not limited thereto.

The cells 110 may be of a cylindrical type in the illustrated embodiment, but are not limited thereto. Other types of cells 110 may also be used if desired. Further, the cells 110 may be connected with, e.g., a series connection, a parallel connection, or a combination of series and parallel connections. Top and bottom surfaces of the cells 110 may have opposite polarities, e.g., negative and positive, respectively.

Each of the conductive plates 200 may electrically connect at least two adjacent cells 110 at top and/or bottom surfaces of the cells 110.

The conductive plate 200 may include connection parts 210 and 210a electrically connected to the cells 110 and a linking part 220 providing a link between the connection parts 210 and 210a.

In an implementation, the conductive plate 200 may be a 2N type conductive plate, which may include the connection parts 210 and 210a at opposite ends of the linking part 220 to electrically connect two cells 110.

The conductive plate 200 may be welded to respective top and bottom surfaces of the cells 110 according to a connection method of the cells 110. In other words, the conductive plate 200 may be adaptively welded to the top and bottom surfaces of the cells 110 according to whether the cells 110 are connected with a series connection, a parallel connection, or a combination of series and parallel connections. For example, it may be assumed that the conductive plate 200 connects the cells 110 to each other at one of the top and bottom surfaces of the cells 110 in an up-down direction relative to the short axis, as shown in FIG. 2. Further, the conductive plate 200 may connect the cells 110 adjacent along the long axis at the other of the top and bottom surfaces of the respective cells 110. In such a manner, the conductive plate adaptively connecting the cells at one surface according to how the cells are connected to each other at the other surface may be easily embodied by one skilled in the art. In other words, it may be easy to connect the cells in series, in parallel, or in a combination of series and parallel.

Each of the connection parts 210 and 210a may include two welding points 211a1 and 212a1. A line L connecting the welding points 211a1 and 212a1 of each of the connection parts 210 and 210a on the respective cells 110 arranged along the short axis may be parallel with the short axis.

Although the conductive plate 200 may be made of any suitable material as long as it has sufficient conductivity, a nickel plate is preferred.

Each of the connection parts 210 and 210a may include a current fence 213 for separating the two welding points 211a1 and 212a1 from each other by a predetermined distance. The current fence 213 may facilitate proper performance of resistance welding.

In detail, as illustrated in FIG. 3, each of the connection parts 210 and 210a may include a first welded part 211 having a first welding point 211a1, a second welded part 212 having a second welding point 212a1, and the current fence 213 separating the first welded part 211 and the second welded part 212 from each other by a predetermined distance.

The linking part 220 may provide a link between the connection parts 210 and 210a and a configuration thereof is not particularly limited.

The battery pack may further include a fixing member 250 for fixing a position of the respective cells 110. The fixing member 250 may be, e.g., a jig into which each of the cells 110 is inserted to be fixed. Since the fixing member 250 may be easily formed by one skilled in the art, a detailed description thereof will not be given.

As described above, the line L connecting the welding points 211a1 and 212a1 of the conductive plate 200 may be parallel with the short axis while the cells 110 are arranged in a predetermined configuration. Accordingly, during a welding operation by an automatic welding device, the automatic welding device may move in an up-down direction relative to the short axis to perform the welding operation and may move in a left-right direction relative the short axis to move along the stack. Thus, movement flow of the automatic welding device may be optimized, thereby improving welding operation efficiency. In particular, if the line L connecting the welding points 211a1 and 212a1 is irregularly disposed or not parallel to the short axis, it may be necessary to rotate the stack 100 prior to welding. According to an embodiment, welding may be performed at a relatively accurate position simply by moving the automatic welding device in the up-down direction and the left-right direction, without rotating the stack 100. Therefore, the battery pack according to the present embodiment may improve welding quality while reducing the possibility of errors generated in the welding operation.

Figure 4:
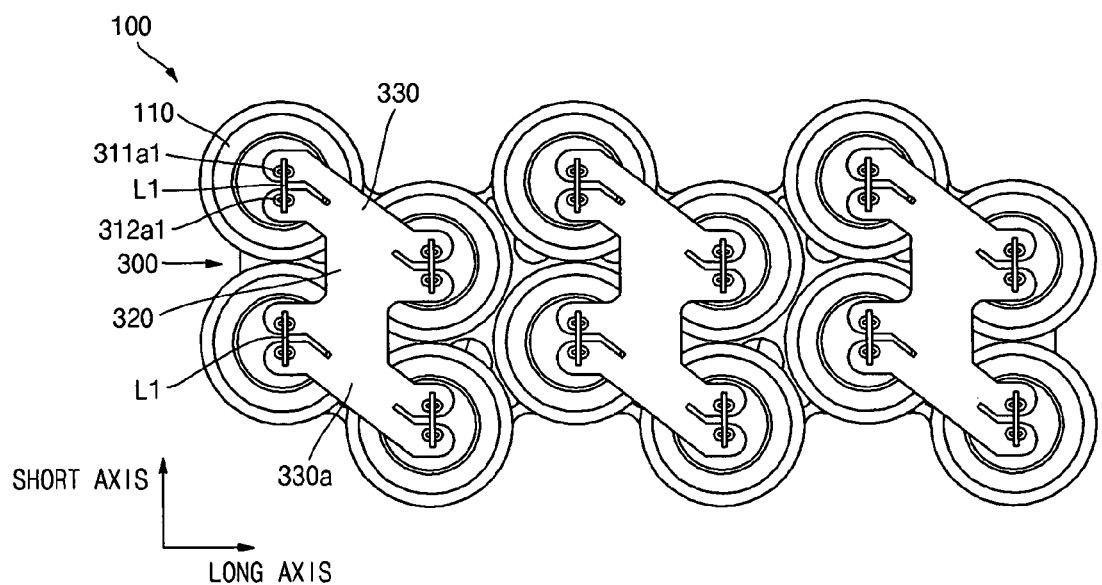
FIG. 4 illustrates a front view of a battery pack according to another embodiment.
Figure 5:
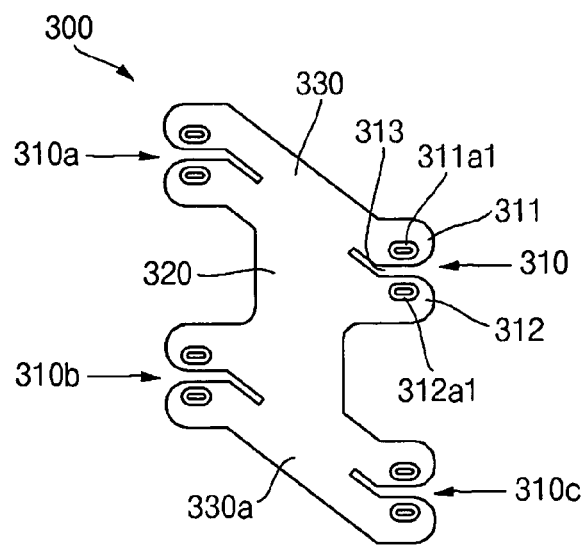
FIG. 5 illustrates a conductive plate of FIG. 4.

FIG. 4 illustrates a front view of a battery pack according to another embodiment. FIG. 5 illustrates a conductive plate of FIG. 4.

As illustrated in FIGS. 4 and 5, the battery pack according to the present embodiment may include a stack 100 including a plurality of cells 110 with top and bottom surfaces having different polarities and a conductive plate 300 electrically connecting the plurality of cells 110 to each other.

The stack 100 may be substantially the same as that described in the previous embodiment and a repeated detailed description thereof will not be given.

The conductive plate 300 may include connection parts 310, 310a, 310b, and 310c electrically connected to the cells 110. The conductive plate 300 may include linking parts 320, 330, and 330a for providing a link between the connection parts 310, 310a, 310b, and 310c. The conductive plate 300 may be a 4N type conductive plate, which includes second linking parts 330 and 330a opposite ends of the linking part 320. The respective connection parts 310, 310a, 310b, and 310c may be at opposite ends of the second linking parts 330 and 330a to electrically connect four cells 110.

Here, the conductive plate 300 may be welded to respective top and bottom ends of the cells 110, according to the connection method of the cells 110. In other words, the conductive plate 300 may be welded to the top and bottom surfaces of the cells 110 in an adaptive manner according to whether the cells 110 are connected with a series connection, a parallel connection, or a combination of series and parallel connections.

Each of the connection parts 310, 310a, 310b, and 310c may include two welding points 311a1 and 312a1. A line L1 connecting the welding points 311a1 and 312a1 at each of the respective cells 110 arranged along the short axis may be parallel with the short axis.

Each of the connection parts 310, 310a, 310b, and 310c may include a current fence 313 for separating the two welding points 311a1 and 312a1 from each other by a predetermined distance. The current fence 313 may facilitate proper performance of resistance welding.

In detail, as illustrated in FIGS. 4 and 5, each of the connection parts 310, 310a, 310b, and 310c may include a first welded part 311 having a first welding point 311a1, a second welded part 312 having a second welding point 312a1, and the current fence 313 separating the first welded part 311 and the second welded part 312 from each other by a predetermined distance.

The linking part 320 may provide a link between the second linking parts 330 and 330a. Each of the second linking parts 330 and 330a may connect the connection parts 310a and 310b or 310 and 310c of each of the respective cells 110.

As described above, the line L1 connecting the welding points 311a1 and 312a1 of the conductive plate 300 may be parallel with the short axis while the cells 110 are arranged in a predetermined configuration. Accordingly, during a welding operation performed by an automatic welding device, the automatic welding device may move in an up-down direction relative to the short axis to perform the welding operation and may move in a left-right direction relative to the short axis to move along the stack. Thus, movement flow of the automatic welding device may be optimized, thereby improving welding operation efficiency. Therefore, the battery pack according to the present embodiment may improve welding quality while reducing the possibility of errors generated in the welding operation.

Figure 6A:
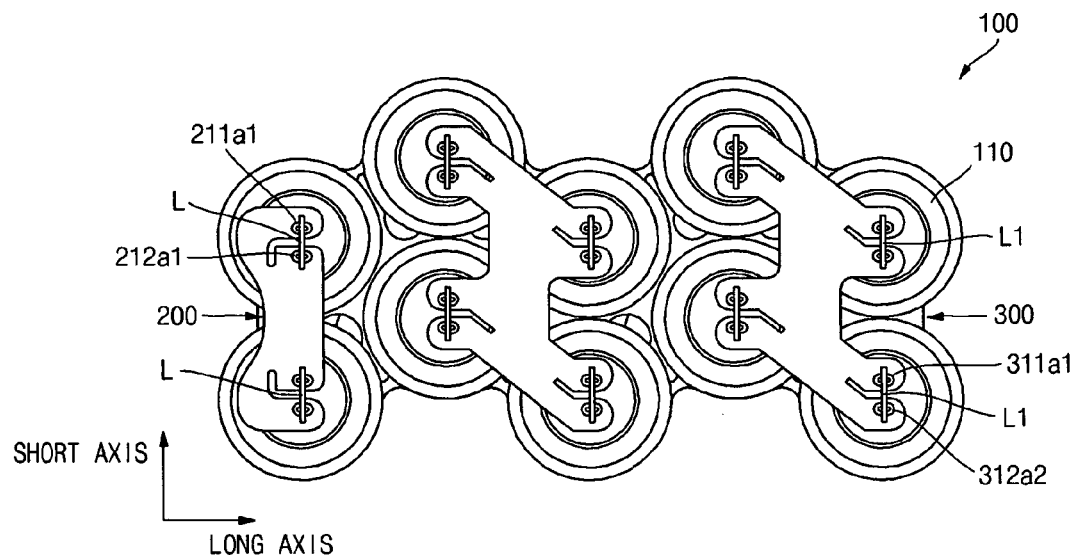
FIG. 6a illustrates a front view of a battery pack according to yet another embodiment.
Figure 6B:
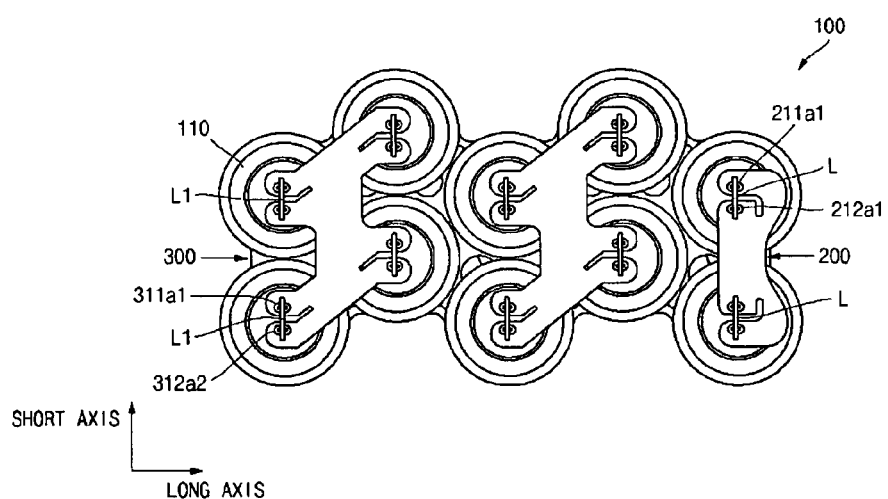

FIG. 6a illustrates a front view of a battery pack according to yet another embodiment. FIG. 6b illustrates a back side of the battery pack of FIG. 6a.

As shown in FIGS. 6a and 6b, the battery pack may include a stack 100 having a plurality of cells 110 having different polarities at top and bottom surfaces thereof. The stack 100 may also include conductive plates 200 and 300 electrically connecting the cells 110 to each other.

Since the stack 100 is substantially the same as described above in the previous embodiments, a repeated detailed description thereof will not be given.

The conductive plates 200 and 300 may include a first conductive plate 200 having substantially the same configuration as that of the embodiment illustrated in FIGS. 1 through 3 and a second conductive plate 300 having substantially the same configuration as that of the embodiment illustrated in FIGS. 4 and 5.

The first conductive plate 200 may be a 2N type conductive plate, which may include a connection part formed at opposite ends of a linking part, thereby electrically connecting two cells 110, i.e., enabling a 2N type configuration.

The second conductive plate 300 may be a 4N type conductive plate, which may include second linking parts formed at opposite ends of a linking part and connection parts formed at opposite ends of each of the second linking parts, thereby electrically connecting four cells 110, i.e., enabling a 4N type configuration.

Numbers of the first conductive plates 200 and the second conductive plates 300 may be appropriately adjusted, as desired. In a preferred embodiment, as illustrated in FIG. 6a, in view of a plane where welding of the conductive plates 200 and 300 is performed, a 4N+2 type configuration may be applied.

Since the first conductive plate 200 and the second conductive plate 300 may be substantially the same as described above in the previous embodiments, a repeated detailed description thereof will not be given. However, the first conductive plate 200 and the second conductive plate 300 may be different from the corresponding ones of the previous embodiments in that the connection parts on the first conductive plate 200 and the connection parts on the second conductive plate 300 may each include two welding points 211a1 and 212a1, and 311a1 and 312a2, which may be formed at the connection parts of the respective cells 110 arranged along the short axis, respectively. In addition, the line L connecting the two welding points 211a1 and 212a1 and the line L1 connecting the two welding points 311a1 and 312a2 may be parallel with the short axis, respectively.

As described above, the line L connecting the two welding points 211a1 and 212a1 and the line L1 connecting the two welding points 311a1 and 312a2 may be parallel with the short axis, respectively, while the cells 110 are arranged in a predetermined configuration. Accordingly, during a welding operation performed by an automatic welding device, the automatic welding device may move in an up-down direction relative to the short axis to perform the welding operation and may move in a left-right direction relative to the short axis to move along the stack 100. Thus, movement flow of the automatic welding device may be optimized, thereby improving the welding operation efficiency. Therefore, the battery pack according to the present embodiment may improve welding quality while reducing the possibility of errors generated in the welding operation.

Figure 7:
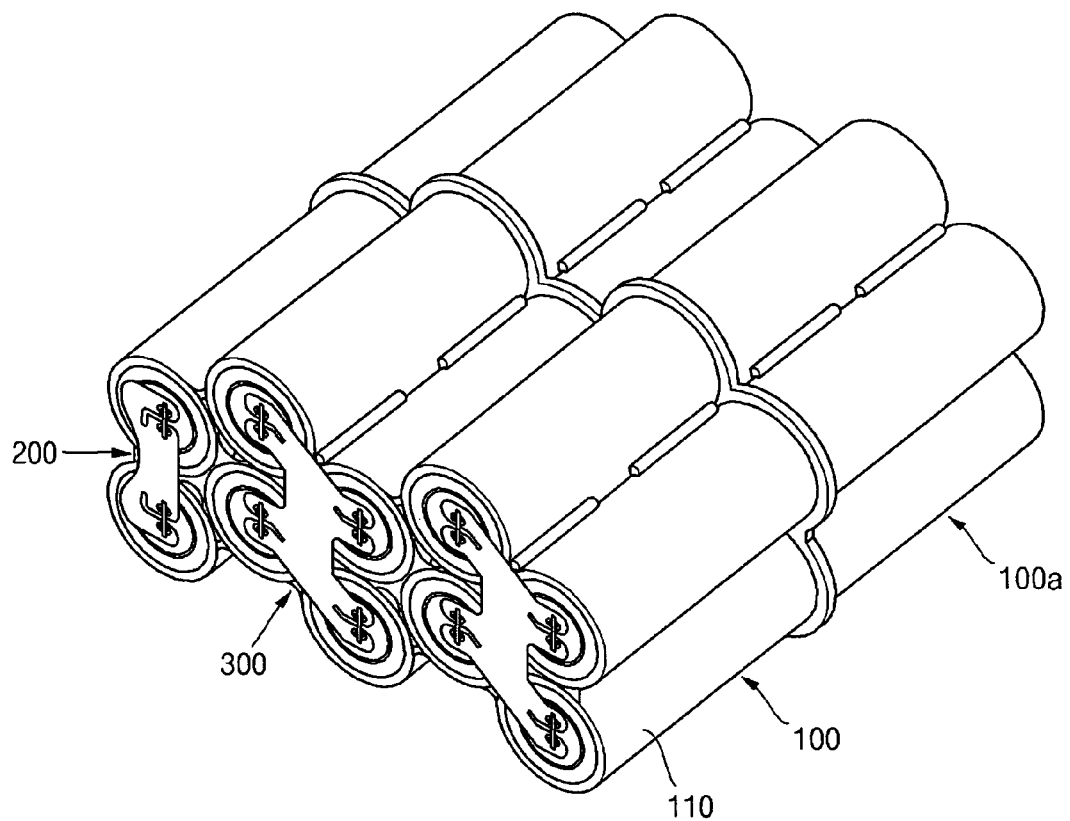

FIG. 7 illustrates a perspective view of the battery pack of FIG. 6a.

As shown in FIG. 7, the battery pack may include stacks 100 and 100a each having a plurality of cells 110 having different polarities at top and bottom surfaces thereof. The stacks 100 and 100a may also include conductive plates 200 and 300 electrically connecting the cells 110 to each other.

Since the stacks 100 and 100a and the conductive plates 200 and 300 have substantially the same configurations as those of the previous embodiments, repeated detailed descriptions thereof will not be given. Unlike the battery packs of the previous embodiments, the battery pack of the present embodiment may include a pair of stacks 100 and 100a.

The stacks 100 and 100a may be connected in series or parallel with each other after welding of the conductive plates is completed. As described above, use of two or more of the stacks 100 and 100*a* in a layered configuration may provide for a high power battery pack.

As described above, in the battery pack according to an embodiment, operation efficiency may be improved by optimizing the movement flow of an automatic welding device performing a welding operation using conductive plates in a state in which a plurality of secondary battery cells are arranged in parallel or series so as to have optimal spatial arrangements.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
   a stack including a plurality of cells having different polarities at top and bottom surfaces thereof, the plurality of cells being arranged such that:
      at least two cells are arranged directly adjacent to each another along a short axis of the stack when viewed from top or bottom surfaces of the cells, and
      center connecting lines of adjacent cells along a long axis of the stack are other than perpendicular to the short axis;
   conductive plates electrically connecting the plurality of cells to each other, each of the conductive plates including connection parts electrically connected to the cells and a linking part between the connection parts,
      wherein each of the connection parts includes at least two welding points; and
   a physically connected welding line connecting the at least two welding points on each of the connection parts,
      wherein the physically connected welding line is parallel to the short axis of the stack.

2. The battery pack as claimed in claim 1, wherein the cells are connected with a series connection, a parallel connection, or a combination of series and parallel connections.

3. The battery pack as claimed in claim 2, wherein the conductive plates are welded to top and bottom surfaces of the cells, respectively, according to a connection method of the cells.

4. The battery pack as claimed in claim 1, wherein each of the connection parts includes a current fence separating the at least two welding points from each other by a predetermined distance.

5. The battery pack as claimed in claim 1, wherein the at least two welding points include a first welding point and a second welding point and wherein each of the connection parts includes a first welded part that in turn includes the first welding point, a second welded part that in turn includes the second welding point, and a current fence separating the first welded part and the second welded part from each other by a predetermined distance.

6. The battery pack as claimed in claim 1, wherein the stack includes two cells arranged along the short axis thereof, and the battery pack includes two or more layered stacks.

7. The battery pack as claimed in claim 1, wherein the conductive plates include a 2N type conductive plate, the 2N type conductive plate:
   including connection parts at opposite ends of the linking part, respectively, and
   electrically connecting two cells.

8. The battery pack as claimed in claim 1, wherein the conductive plates include a 4N type conductive plate, the 4N type conductive plate:
   including second linking parts at opposite ends of the linking part and a connection part at opposite ends of the respective second linking parts, and
   electrically connecting four cells.

9. The battery pack as claimed in claim 1, wherein the conductive plates include:
   a first conductive plate of a 4N type configuration, the 4N type configuration conductive plate:
      including second linking parts at opposite ends of the linking part, and connection parts at opposite ends of each of the second linking parts, and
      electrically connecting four cells; and
   a second conductive plate of a 2N type configuration, the 2N type configuration conductive plate including:
      a connection part at opposite ends of the linking part, and
      electrically connecting two cells.

* * * * *